Figure 8:
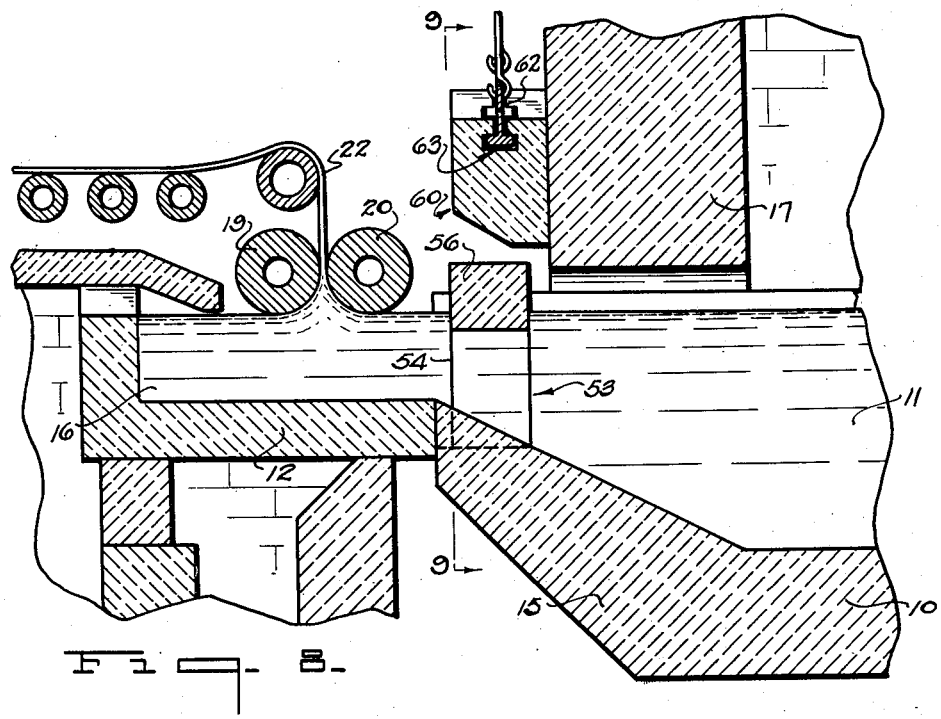

March 24, 1936.  J. E. MAMBOURG  2,035,272
APPARATUS FOR PRODUCING SHEET GLASS
Filed Dec. 23, 1933  3 Sheets-Sheet 1
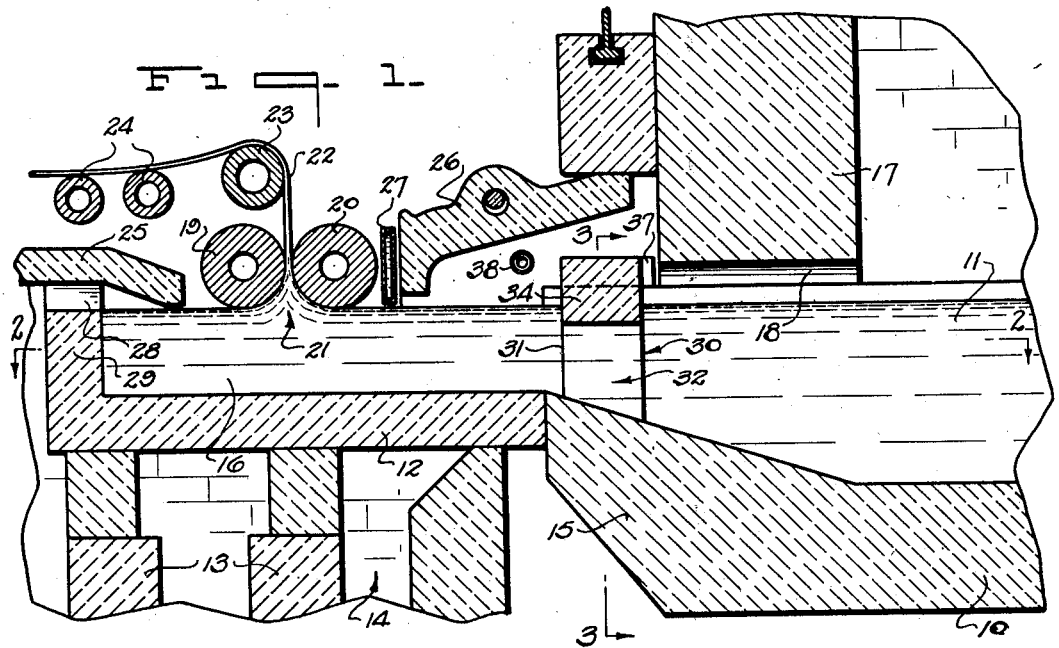
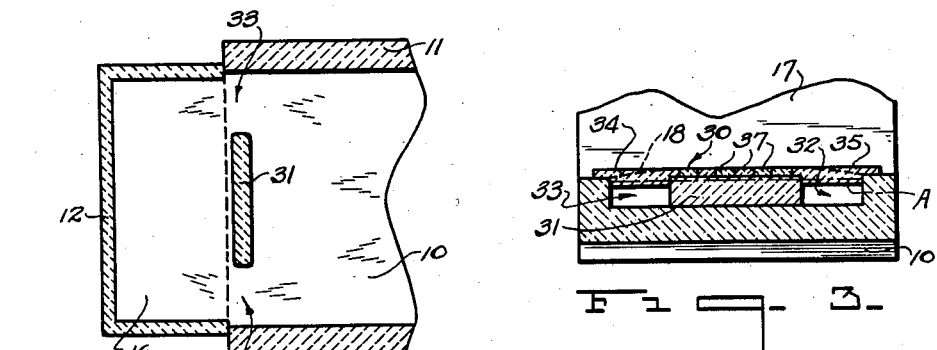
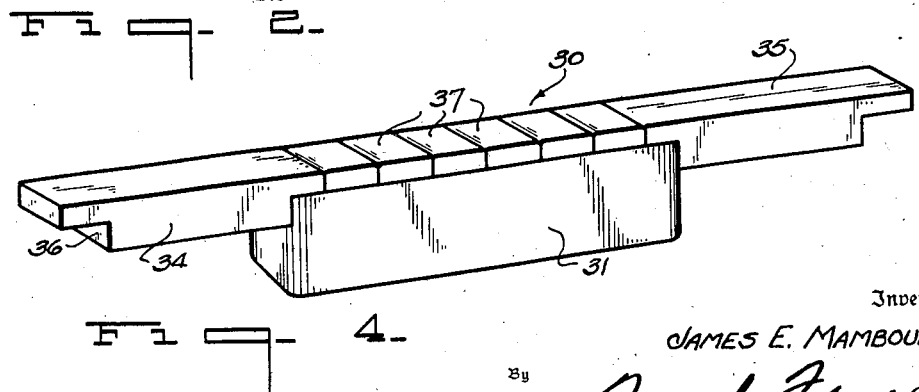
Inventor
JAMES E. MAMBOURG.
By Frank Fraser
Attorney March 24, 1936.  J. E. MAMBOURG  2,035,272
APPARATUS FOR PRODUCING SHEET GLASS
Filed Dec. 23, 1933  3 Sheets-Sheet 2
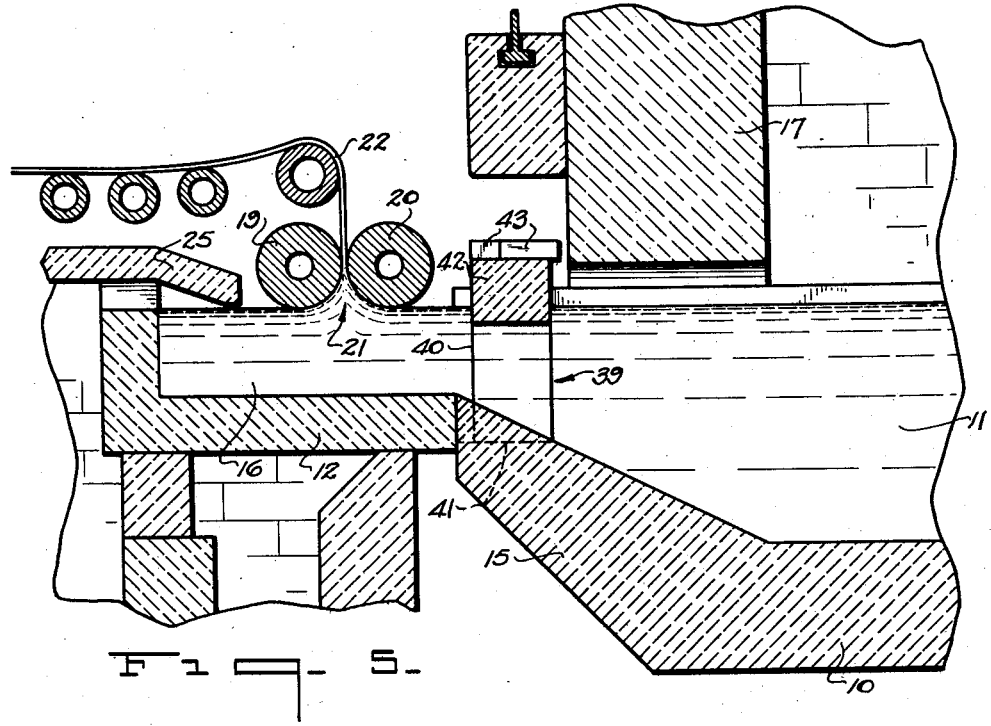
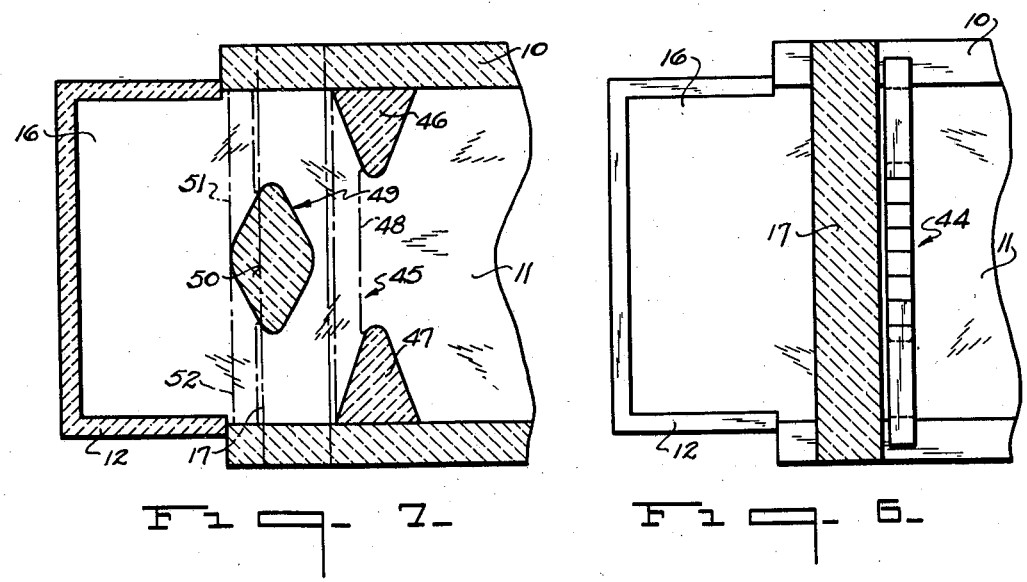
Inventor
JAMES E. MAMBOURG.
By Frank Fraser,
Attorney March 24, 1936. J. E. MAMBOURG 2,035,272

APPARATUS FOR PRODUCING SHEET GLASS

Filed Dec. 23, 1933 3 Sheets-Sheet 3

Inventor
JAMES E. MAMBOURG.

By Frank Fraser
Attorney

Patented Mar. 24, 1936

2,035,272

UNITED STATES PATENT OFFICE 2,035,272

APPARATUS FOR PRODUCING SHEET GLASS

James E. Mambourg, Charleston, W. Va., assignor to Libbey-Owens-Ford Glass Company, Toledo, Ohio, a corporation of Ohio Application December 23, 1933, Serial No. 703,735

4 Claims. (Cl. 49—17)

The present invention relates to an improved apparatus for producing continuous sheet glass.

In the production of sheet glass according to one well known process, a pair of relatively large, internally cooled rotatable sheet forming rolls are mounted side by side above and in close proximity to the surface of a bath of molten glass contained in a relatively shallow working receptacle or draw-pot, said receptacle being continuously supplied with molten glass from a tank furnace communicating therewith. The two forming rolls are horizontally spaced from one another to create a vertical sheet forming pass therebetween and upon rotation are adapted to draw a relatively heavy body of glass upwardly from the molten bath and reduce it to a sheet of substantially predetermined and uniform thickness. The sheet is continued upwardly for a short distance and then deflected over a bending roll into the horizontal plane, said sheet being carried forwardly upon a series of conveying rolls which deliver it into a flattening chamber from which it passes into and through an annealing leer.

The above type of rolling machine is primarily designed for use in the production of plate glass blanks, although it is of course not limited to such use. The expression "plate glass blank" is employed in the art to designate a sheet of glass which is to be subsequently ground and polished to render its surfaces perfectly flat and optically true. The finished sheet thus formed is known in the art as "plate glass."

In the production of plate glass blanks upon such a rolling machine referred to above, it is essential that the molten glass in the working receptacle be maintained at a relatively high temperature and, in fact, at a considerably higher temperature than is necessary in some other processes of forming sheet glass, such as, for example, in the well known Colburn sheet drawing process. This relatively high temperature is required in order, among other things, to offset the relatively great chilling effect produced by the internally cooled sheet forming rolls, whereby the glass can be maintained at a temperature sufficient to permit of the drawing up of a relatively heavy body of molten glass and the rolling thereof to sheet form. It is also necessary, in order to facilitate the proper formation of the sheet, that the temperature of the molten glass in the working receptacle be maintained as nearly uniform as possible across the width thereof.

A rolling machine of the above character naturally withdraws a much larger tonnage of glass from the furnace in a day than does, for instance, the Colburn machine.

Heretofore, it has been customary for the glass to flow from the tank furnace into the shallow working receptacle in the form of a relatively thin stream or body, such stream being of a width substantially equal to that of said receptacle. With such an arrangement, however, the molten glass in the working receptacle is not of a uniform temperature throughout the width of said receptacle, but instead the edges or border portions of the stream of glass are relatively cooler than the central portion thereof due to the proximity of the edges of the stream to the side walls of the furnace and the dissipation of heat therethrough. This ununiform temperature condition of the molten glass in the working receptacle is unquestionably detrimental to the continuous formation of a good quality glass sheet.

An important object of the present invention, therefore, is the provision of an improved apparatus for feeding the molten glass from the furnace into the working receptacle in a manner to improve the temperature conditions of the glass in the latter, making them more uniform across the width of said receptacle than heretofore, to the end that a better quality sheet may be produced at a greater speed.

Another object of the invention is the provision of such an apparatus wherein the hotter central flow of molten glass is diverted from the center of the furnace and the glass caused to enter the working receptacle at the sides thereof only instead of across its entire width, to the end that hotter glass will be delivered to the edges of the sheet being formed, thereby reducing devitrification of glass in the receptacle and eliminating intermittent seed condition on the edges of the sheet.

A further object of the invention is the provision, in such an apparatus, of means for skimming the molten glass flowing into the working receptacle so as to hold back any surface impurities which may be present thereupon together with means for regulating the amount of heat passing from the furnace to the working receptacle whereby to provide for a more accurate control of the temperature of the glass in the latter.

Other objects and advantages of the invention will become more apparent during the course of the following description when taken in connection with the accompanying drawings.

Figure 9:
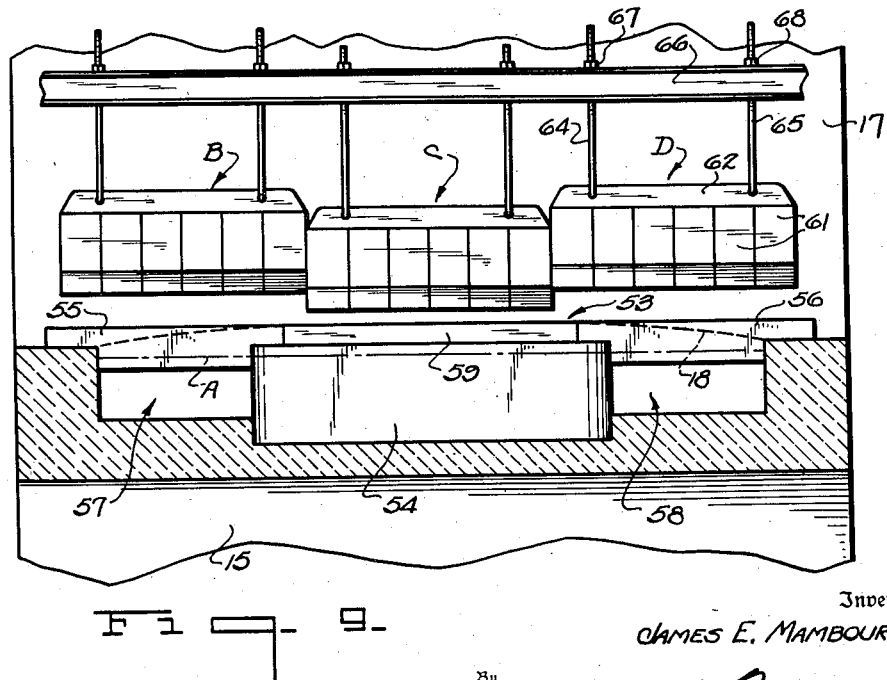

In the drawings wherein like numerals are employed to designate like parts throughout the same, Fig. 1 is a vertical longitudinal section through one form of sheet glass apparatus constructed in accordance with the present invention, Fig. 2 is a horizontal section taken substantially on line 2—2 of Fig. 1, Fig. 3 is a vertical section taken substantially on line 3—3 of Fig. 1, Fig. 4 is a perspective view of the flow controlling and heat regulating member, Fig. 5 is a view similar to Fig. 1, but showing a somewhat modified form of apparatus, Fig. 6 is a horizontal section showing another modified arrangement, Fig. 7 is a horizontal section showing a still further arrangement embodying the principles of the present invention, Fig. 8 is a vertical longitudinal section through still another modified arrangement, and Fig. 9 is a vertical section taken substantially on line 9—9 of Fig. 8.

Referring now to the drawings and particularly to Figs. 1 to 4, the numeral 10 designates generally the cooling chamber of a continuous tank furnace containing a mass of molten glass 11. This molten glass is first produced in the melting end of the furnace (not here shown but being to the right of Fig. 1) by melting suitable batch ingredients therein, the molten glass being then caused to flow slowly through the refining portion or portions of the furnace into the cooling chamber 10, which chamber is preferably somewhat narrower and shallower than the refining and melting portions.

Connected to the forward end of the cooling chamber 10 and in open communication therewith is a relatively shallow working receptacle or draw-pot 12 mounted upon stools 13 within a heating chamber 14 heated in any desired manner. The end of the cooling chamber 10 terminates in a so-called goose-neck 15 which abuts the working receptacle 12. The working receptacle 12 has a flat bottom so that the pool or bath of molten glass 16 contained therein is of a uniform depth. Positioned substantially at the juncture of the cooling chamber 10 and working receptacle 12 is a stationary jack-arch 17, the bottom 18 of which is arcuately curved as best shown in Fig. 3. Since this particular type of glass melting furnace is well known in the art, it is not believed necessary to illustrate the same in detail nor to enter into any more detailed description thereof.

Arranged above the bath of molten glass 16 within working receptacle 12 is a pair of sheet forming rolls 19 and 20 respectively mounted with respect to one another to create a vertical sheet forming pass therebetween. The rolls are adapted to be positively driven and, upon rotation, are adapted to draw a relatively heavy body of glass 21 upwardly from the molten bath 16 and reduce it to a sheet 22 of substantially predetermined and uniform thickness. The sheet may be continued upwardly for a relatively short distance and then deflected over a rotatable bending roll 23 into the horizontal plane and carried forwardly upon a series of conveying rolls 24 into and through an annealing leer (not shown).

In order to assist in properly conditioning the pool of molten glass 16 in working receptacle 12 and to protect the forming rolls and sheet, there are arranged above the working receptacle, at opposite sides of the forming rolls, suitable cover or lip-tiles 25 and 26 respectively. Associated with the cover-tile 26 is a cooler 27 also serving to prevent heat and gases from striking the forming rolls and also from striking and injuring the sheet being formed. The cover-tile 25 is relatively flat and is supported intermediate its ends upon a plurality of spaced blocks 28 mounted upon the end wall 29 of the working receptacle so as to permit a certain amount of heat to pass from the chamber 14 beneath the tile and to be directed thereby downwardly upon the glass. A certain amount of heat also passes from the furnace beneath the jack-arch 17 and is directed downwardly upon the glass by the lip-tile 26. The temperature of the molten glass in the working receptacle is controlled to a large extent by the heat issuing from the furnace and pot chamber.

As brought out above, the aim of this invention is the provision of a novel and improved method and means for controlling the flow of molten glass from the furnace into the working receptacle as well as for regulating the amount of heat passing beneath the jack-arch 17. Heretofore, the molten glass has ordinarily been permitted to flow from the cooling chamber 10 into the working receptacle 12 in a body or stream extending substantially the entire width of the latter. However, since the glass at the center of the cooling chamber is relatively hotter than the glass adjacent the side walls thereof, the stream of glass flowing into the working receptacle is not of a uniform temperature throughout its width, as a result of which the glass being drawn upwardly into the edges or border portions of the sheet would be considerably cooler than the glass being drawn into the center thereof. This ununiform temperature condition resulted in manufacturing difficulties which prevented the continuous production of a flat sheet of glass of predetermined and uniform thickness. According to the instant invention, the molten glass is caused to flow from the cooling chamber into the working receptacle in such a manner that the glass in said receptacle will be of a more nearly uniform temperature across the width thereof than heretofore, thereby greatly facilitating the proper formation of the sheet.

In carrying out the invention, and still referring to Figs. 1 to 4, there is arranged within the cooling chamber 10 at substantially the juncture thereof with the working receptacle 12 a flow controlling and heat regulating member designated in its entirety by the numeral 30. This member comprises an elongated refractory block 31 extending transversely of the cooling chamber and being positioned to obstruct the central flow of glass therethrough, said block resting upon the bottom of the goose-neck 15 and terminating slightly above the level of the molten glass which is indicated at A in Fig. 3. The block 31 does not extend the entire width of the cooling chamber but is spaced from the opposite side walls thereof to provide channels 32 and 33 respectively through which the glass is caused to flow into the working receptacle 12. It will thus be readily apparent, and especially upon reference to Fig. 2, that the block 31 serves to obstruct the flow movement of the molten glass at the center of the cooling chamber and causes the glass to flow into the working receptacle at the sides thereof only.

As pointed out above, the molten glass at the center of the cooling chamber is relatively hotter than the glass adjacent the side walls thereof. Consequently, by diverting the flow of glass from the center of the cooling chamber and causing it to enter the working receptacle in two relatively narrow streams adjacent the opposite sides thereof, a more uniform temperature condition across the width of the said receptacle may be obtained. The flowing of the glass into the working receptacle in this manner will stimulate the flow of glass at the sides of the cooling chamber and will deliver hotter glass to the edges of the sheet, which will reduce to a minimum devitrification of the glass in the working receptacle as well as eliminate intermittent seed condition on the edges of the sheet. Furthermore, this uniformity of temperature across the working receptacle will greatly facilitate the continuous production of a sheet of constant flatness and thickness and will also permit the rolling of the sheet at a greater speed. The block 31 is, of course, not limited to the particular shape disclosed in the drawings.

Associated with the opposite ends of the block 31 are the two end members 34 and 35 which extend over the channels 32 and 33 respectively and rest at their outer ends upon the side walls of the cooling chamber each member 34 and 35 having its outer end notched as at 36. Although the end members may be disposed above the level of the molten glass, they are preferably slightly immersed therein so that they function as skimmers to retard the surface glass flowing through the said channels and thereby prevent any impurities present upon the top of the glass from flowing into the working receptacle. The impurities collected in back of the end members 34 and 35 may be removed in any suitable manner, such as by means of ladles inserted through openings in the side walls of the cooling chamber.

The flow controlling member 30 is positioned closely adjacent the jack-arch 17 at the side thereof adjacent the working receptacle and carried upon the top of the block 31, between the end members 34 and 35, are a plurality of bricks 37 arranged side by side and movable independently of one another toward and away from the jack-arch. These bricks 37 are adapted to cooperate with the jack-arch 17 to control and regulate the amount of heat passing beneath the latter from the furnace. This may be accomplished by simply moving the bricks toward or away from the jack-arch to increase or decrease the opening or space between the said arch and bricks. If found desirable, a suitable burner 38 may be employed beneath the lip-tile 26 to assist in heating the glass in the pot and to prevent the glass contacting with the member 30 from becoming devitrified.

In Fig. 5 of the drawings there is illustrated a somewhat modified arrangement in which the lip-tile 26, disclosed in Fig. 1, is eliminated and the working receptacle 12 shortened to bring the forming rolls 19 and 20 closer to the cooling chamber 10. The flow controlling and skimming member is here designated in its entirety by the numeral 39 and is of substantially the same construction and arrangement as the member 30 illustrated in Figs. 1 to 4. Thus, the member 39 also extends transversely of the cooling chamber 10 at substantially the juncture thereof with the working receptacle 12 and comprises a central block 40 similar to block 31 above described. The block 40 is immersed in the molten glass in a manner to obstruct the flow movement of the central portion thereof and to divert the said glass towards the sides of the cooling chamber. The block 40 also terminates inwardly of the side walls of the cooling chamber to provide channels through which the glass is caused to flow into the working receptacle. The bottom surface of the block 40 may be cut at an angle corresponding to the inclination of the bottom of the goose-neck 15, or the lower end of said block may be received within a notched or cut-away portion 41 formed in the said goose-neck.

Associated with each end of the central block 40 is an end member 42, which end members are also preferably, though not necessarily, immersed slightly in the molten glass to skim the glass flowing into the working receptacle.

To control and regulate the passage of heat from the furnace beneath the jack-arch 17, there may be provided a plurality of bricks 43 positioned side by side upon the member 39, and these bricks may be arranged either across the entire width of the cooling chamber or only at the central portion thereof, as preferred. It will be readily understood that by moving the bricks horizontally toward or away from the jack-arch 17, the opening or space between the jack-arch and member 39 may be increased or decreased as found convenient to regulate the escape of heat beneath the said jack-arch.

In Fig. 6 there has been illustrated a flow controlling and heat regulating member 44 which may be of the specific construction illustrated in either Figs. 1 to 4 or in Fig. 5, the principal difference being that in this case the member 44 is positioned at the side of the jack-arch 17 adjacent the furnace rather than at the side thereof adjacent the rolling machine as shown in Figs. 1 and 5.

A further modified construction has been illustrated in Fig. 7, and with this arrangement the molten glass is first diverted from the opposite sides of the cooling chamber toward the center thereof, after which the glass is diverted from the center of the cooling chamber toward the opposite sides to the end that the molten glass will flow into the working receptacle adjacent the opposite sides thereof only. As pointed out above, the glass at the center of the cooling chamber is relatively hotter than the glass adjacent the side walls thereof. Consequently, with this arrangement, the colder glass is first diverted into the hotter central stream, after which the hot stream is caused to spread outwardly toward the sides of the cooling chamber, as a result of which the molten glass will be of a substantially uniform temperature when it enters the working receptacle.

To accomplish the above, there is provided, in advance of the jack-arch 17, a flow controlling member 45 including the two end blocks 46 and 47 which are immersed in the molten glass closely adjacent the side walls of the cooling chamber and preferably extend throughout the depth thereof. The blocks 46 and 47 are connected together by a transverse connecting member 48 which is preferably, though not necessarily slightly immersed in the molten glass to skim the glass flowing therebeneath. Positioned at the opposite side of the jack-arch is a second flow controlling member 49 comprising a central block 50 and the two transverse end members 51 and 52. The block 50 is immersed in the molten glass at the center of the cooling chamber in substantial alignment with the opening between the blocks 46 and 47. The block 50, therefore, serves to divert the glass toward the sides of the cooling chamber and causes the glass to enter the working receptacle opposite the edges of the sheet being formed. The end members 51 and 52 are also preferably slightly immersed in the molten glass to hold back any surface impurities which may be present thereupon. If desired, a plurality of bricks can be carried upon one or both of the flow controlling members 45 and 49 to regulate the escape of heat from the furnace beneath the jack-arch 17.

In that form of the invention illustrated in Figs. 8 and 9, the flow controlling member is designated in its entirety by the numeral 53 and comprises the central block 54 and the two end members 55 and 56 respectively associated with the opposite ends thereof. The flow controlling member extends transversely of the furnace and the block 54 is set in the molten glass in a manner to obstruct the central flow of glass through the cooling chamber while the end members 55 and 56 are preferably slightly immersed in the molten glass so that they function as skimmers to retard the surface glass flowing through the channels 57 and 58 into the working receptacle 12 and thereby hold back any impurities present upon the top of the glass. A refractory tile 59 is carried upon the top of block 54 between end members 55 and 56 and has its upper surface flush with the upper surfaces of the said end members.

For the purpose of controlling the amount of heat passing from the furnace beneath the jack-arch 17, there is provided a refractory curtain designated in its entirety by the numeral 60 and being positioned directly above the flow controlling member 53 at the side of the jack-arch adjacent the working receptacle. The refractory curtain 60 extends the entire width of the cooling chamber and is made up of a plurality of, and as here shown three, units or sections B, C and D arranged side by side as clearly illustrated in Fig. 9. Each unit or section B, C and D comprises a plurality of refractory blocks or tiles 61 suspended from a horizontal retaining member 62, said member being substantially T-shaped and fitting in T-shaped slots 63 in the said tiles 61. The tile retaining member 62 is carried at its opposite ends by vertical rods 64 and 65 which pass upwardly through a horizontal supporting beam 66 and have threaded upon their upper ends nuts 67 and 68. With this arrangement, it will be readily apparent that the curtain sections B, C and D are movable vertically independently of one another and that they cooperate with the flow controlling member 53 to regulate and control the amount of heat passing beneath the jack-arch 17. If preferred, the curtain 60 need not be constructed of a plurality of separate sections, but this construction is desirable as it permits of more flexibility of control.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a mass of molten glass, a tank furnace in communication with said receptacle for supplying the molten glass thereto, means for forming a sheet from the glass in said receptacle, means immersed in the molten glass adjacent the opposite side walls of the furnace for causing the glass to flow toward the center of the furnace, and means immersed in the molten glass in back of said first-mentioned means for causing the glass to flow from the center of the furnace toward the opposite sides thereof and to enter the working receptacle opposite the edges of the sheet being formed.

2. In sheet glass apparatus, a receptacle containing a mass of molten glass, a tank furnace in communication with said receptacle for supplying the molten glass thereto, means for forming a sheet from the glass in said receptacle, blocks immersed in the molten glass in the furnace adjacent the opposite side walls thereof for causing the glass to flow toward the center of the furnace, a member connecting said blocks and being immersed in the molten glass to skim the glass flowing between said blocks, a block immersed in the molten glass at substantially the juncture of the furnace and working receptacle for diverting the flow of glass passing between the first-mentioned blocks from the center of the furnace to the opposite sides thereof, said second-mentioned block cooperating with the side walls of the furnace to provide spaced channels through which the glass is caused to flow into said receptacle in two streams, and end members associated with said second-mentioned block and extending over said channels, said end members being immersed in the streams of glass flowing into the receptacle to retard the surface glass of said streams.

3. In sheet glass apparatus, a receptacle containing a mass of molten glass, a tank furnace in communication with said receptacle for supplying the molten glass thereto, means arranged above the receptacle for drawing a sheet upwardly therefrom, a jack-arch arranged at substantially the juncture of the furnace and receptacle and having its lower end spaced above the molten glass, a block immersed in the molten glass in the furnace adjacent the jack-arch for diverting the flow of glass from the center of the furnace and causing it to enter said receptacle at the sides thereof only, and means carried by said block and cooperating with the jack-arch for controlling the passage of heat therebeneath from the furnace.

4. In sheet glass apparatus, a receptacle containing a mass of molten glass, a tank furnace in communication with said receptacle for supplying the molten glass thereto, means arranged above the receptacle for drawing a sheet upwardly therefrom, a jack-arch arranged at substantially the juncture of the furnace and receptacle and having its lower end spaced above the molten glass, a block immersed in the molten glass in the furnace adjacent the jack-arch for diverting the flow of glass from the center of the furnace to the opposite sides thereof, said block cooperating with the side walls of the furnace to provide spaced channels through which the glass is caused to flow into said receptacle in two streams, end members associated with the opposite ends of said block and extending over said channels, said members being immersed in the streams of glass flowing into the receptacle to retard the surface glass of said streams, and a plurality of bricks carried by said block and cooperating with the jack-arch for controlling the passage of heat therebeneath from the furnace.

JAMES E. MAMBOURG.